Patented Feb. 13, 1951

2,541,466

UNITED STATES PATENT OFFICE 2,541,466

ALPHA-FLUOROMETHYL ACRYLONITRILES AND COPOLYMERS THEREOF

Joseph B. Dickey, Rochester, N. Y., assignor to Eastman Kodak Company, Rochester, N. Y., a corporation of New Jersey No Drawing. Application May 21, 1949, Serial No. 94,742

7 Claims. (Cl. 260—85.5)

This invention relates to methacrylonitrile compounds which are substituted in the methyl group with fluorine atoms, polymers thereof, and to methods for preparing the same.

This application is a continuation-in-part of my copending applications Serial Nos. 665,620 and 665,621, both filed April 27, 1946 (now United States Patents 2,472,811 and 2,472,812, respectively, both dated June 14, 1949).

The new compounds of the invention can be represented by the structural formula:

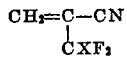

wherein X represents an atom of hydrogen or an atom of fluorine. The above-defined compounds of the invention are valuable intermediates for the preparation of other useful compounds.

They are also polymerizable alone or conjointly with one or more other unsaturated organic compounds to resinous polymers which have higher melting points and greater stability to heat and combustion than do similar, but non-fluorinated, methacrylonitrile polymeric resins. The copolymers of the invention are especially useful for the preparating of coating and impregnating compositions, sheets, threads, fibers, etc. The molded or shaped copolymers can be worked mechanically by known methods of milling, sawing, etc.

It is, accordingly, an object of my invention to provide new fluoromethyl acrylonitrile compounds and a process for preparing the same. Another object is to provide new resinous polymers of the fluoromethyl acrylonitrile compounds and a process for preparing such resinous polymers. Other objects will become apparent hereinafter.

In accordance with the invention, the new monomeric fluoromethyl acrylonitriles can be prepared by treating fluoroacetone cyanhydrin compounds represented by the general formula:

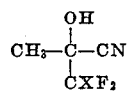

wherein X has the same meaning as previously defined, with thionyl chloride or by pyrolysis of such cyanhydrins at about 140°–180° C. The new monomeric compounds can also be prepared by first preparing the α-acyloxy derivative of the above type of cyanhydrins, for example, α-acetoxy-α-trifluoromethyl-propionitrile, and pyrolyzing this derivative at from 150° to 600° C.

The intermediate fluoroacetone cyanhydrins can be prepared by known methods such as by treating 1,1-difluoroacetone or 1,1,1-trifluoroacetone with sodium cyanide and a mineral acid or by treating the above ketones with liquid hydrogen cyanide. Catalysts such as pyridine, triethylamine, and similar kinds of organic bases can advantageously be employed to promote the reaction. The 1,1-difluoroacetone intermediate can be prepared as described by Desirant, Bull. Acad. roy. Belgique (5) 13, 966 (1929), while the 1,1,1-trifluoroacetone intermediate can be prepared as described by Swarts, Bull. Acad. roy. Belgique (5), 12, 695 (1926); ibid., (5) 13, 175–180 (1927).

The polymerization of the new fluoromethyl acrylonitrile compounds of the invention alone or conjointly with one or more other unsaturated organic compounds, is accelerated by heat, light, X-rays in aqueous solutions or by polymerization catalysts. Exemplary of catalysts which can be employed for the preparation of the copolymers of the invention are the organic peroxides (e. g. benzoyl peroxide, acetyl peroxide, lauroyl peroxide, etc.), hydrogen peroxide, perborates (e. g. alkali metal perborates), persulfates (e. g. ammonium and alkali metal persulfates), boron trifluoride, and the like. The homopolymers of the invention can be prepared by polymerizing the monomers in the presence of other polymerization catalysts of the non-peroxide type, for example, in the presence of an alkyl phosphite (e. g. triethyl phosphite, etc.) or an organic base (e. g. triethylamine, quinoline, pyridine, etc.). These latter catalysts do not require the added presence in the polymerization reaction mixture of other catalysts such as the peroxide type of catalysts to bring about homopolymerization. The alkyl phosphite and organic base catalysts show selective polymerizing activity in the temperature range of from below 0° C. to 100° C., and above, and in many cases wherein the peroxide type of catalyst is ineffective in producing homopolymerization, they readily give good quality resinous homopolymers. The processes of polymerizing various unsaturated organic compounds in the presence of alkyl phosphites, and in the presence of organic bases, are described and claimed in copending applications Serial No. 94,744 and Serial No. 94,743, respectively, both filed of even date herewith in the names of J. B. Dickey and H. W. Coover. The polymerization can be effected in mass or in the presence of an inert diluent (e. g. water, acetonitrile, 1,4-dioxane, etc.). However, the monomers can also be emulsified in a liquid in which they are insoluble and the emulsion then subjected to polymerization. The monomers can also be suspended in water using a relatively poor dispersing agent (e. g. starch) and polymerized in granular form. The monomers can also be copolymerized by the above-described methods with one or more copolymerizable unsaturated organic compounds, for example, with vinyl compounds which contain the basic $CH_2=C<$ group such as vinyl acetate, vinyl butyrate, vinyl propionate, vinyl trifluoroacetate, acrylic acid, methyl acrylate, methyl methacrylate, styrene, ortho-acetaminostyrene, alpha-methylstyrene, 2,4-dichloro-alpha-methylstyrene, acrylonitrile, methacrylonitrile, alpha-acetoxy methyl acrylate, vinyl chloride, vinyl fluoride, vinylidene dichloride, vinylidene chloride-fluoride, vinyl methyl ketone, vinyl methyl ether, vinyl methyl sulfone, vinyl sulfonamide, trans-$\beta$-cyano- and carboxamido-methyl acrylate, vinyl methyl urethane, acrylamide, acrylic acid ethyl-amide, vinyl phthalimide, vinyl succinimide, vinyl naphthalene, isobutylene, ethylene, butadiene, alpha-acetoxybutadiene-1,3 and with unsaturated organic compounds such as maleic anhydride, methyl maleate, methyl fumarate, methylene malononitrile, diisopropyl fumarate, and the like.

The copolymers of the invention may contain variable amounts of each comonomer and are obtained with starting polymerization mixtures having from 5 to 95 molecular proportions of the new fluoromethyl acrylonitrile unsaturates and from 95 to 5 molecular proportions of the above-mentioned other unsaturated organic compounds. However, the preferred mixtures contain from 10 to 90 molecular proportions of the new unsaturates and from 90 to 10 molecular proportions of the other unsaturated comonomer. The temperature of copolymerization at normal pressures may be varied from 30° C. to 120° C., preferably from 30° to 75° C., although in cases where high pressure is employed the temperature may be as 200° C., and where triethyl phosphite or an ionic catalyst such as boron trifluoride is employed the temperature may be as low as —75° C. and still give satisfactory resinous copolymers. Where the copolymerization is carried out in an inert solvent medium such as those previously mentioned, the concentration of the monomers to be copolymerized may be varied from 1 to 25 per cent of the weight of the solvent employed.

The following examples will serve to illustrate my new unsaturates, polymers thereof, and the manner of preparing the same.

Example 1

*Alpha-difluoromethyl acrylonitrile.*—24 grams of 1,1-difluoroacetone cyanhydrin were heated with 27 grams of thionyl chloride on a steam bath under a reflex condenser for a period of about 6 hours. The excess of acid chloride and acids which formed in the reaction were removed by washing the reaction mixture with aqueous sodium bicarbonate, after which the mixture was fractionated to give alpha-difluoromethyl acrylonitrile and alpha-difluorochloro isobutyronitrile. The above acrylonitrile can also be prepared by pyrolysis above 150° C. of compounds having the general formula:

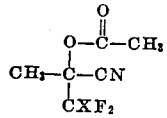

wherein X represents an atom of hydrogen, a fluorine atom or a chlorine atom.

Example 2

*Alpha-trifluoromethyl acrylonitrile.*—(a) 13.9 grams of 1,1,1-trifluoroacetone cyanhydrin were dissolved in 100 c. c. of dry pyridine and 14 grams of thionyl chloride were added dropwise while stirring at 0° C. The stirring was continued for several hours and the reaction mixture allowed to warm gradually to 25° C., at which point it was maintained for several more hours. At the end of this time, the reaction mixture was rapidly warmed to about 100° C. and kept at this temperature for 15 minutes, when it was poured into ice water and made first acid to Congo paper with 5 per cent sulfuric acid. The aqueous mixture was extracted with diethyl ether, dried over anhydrous sodium sulfate and distilled.

The product obtained was alpha-trifluoromethyl acrylonitrile, a colorless liquid having a boiling point of approximately 73° C.

(b) 175 grams of 1,1,1-trifluoroacetone were introduced through a gas bubbler into an ice cold solution of 104 grams (1,6 moles) of potassium cyanide in 400 c. c. of water contained in a 2 liter 3-necked flask fitted with a Dry-Ice condenser. The flask was placed in an ice bath and stirred and cooled during the addition of the ketone to the yellow solution obtained, while still cold, there were added a cold solution of 82 c. c. of concentrated sulfuric acid and 200 c. c. of water. After the addition was completed, the stirring was continued for a short time at room temperature. There was obtained a two-layer liquid of a heavy oil and an aqueous solution. The oil layer was separated out and the aqueous solution twice extracted with ether. The ether extract and the oil layer were then combined and dried over anhydrous sodium sulfate. The ether was flashed off and the residue fractionally distilled. The product, trifluoroacetone cyanhydrin, was obtained over a range boiling from 48° to 53° C. at 20 mm. pressure, the main portion boiling from 50° to 53° C. The total yield was 141 grams.

To 27.8 grams of trifluoroacetone prepared as above described, there were added slowly 16 grams of acetyl chloride. After the addition was completed, the reaction mixture was heated to gentle reflux for a period of about 2 hours. On fractional distillation of the reaction mixture, there were obtained 28 grams of $\alpha$-acetoxy-$\alpha$-trifluoromethyl-propionitrile having a boiling point of 143° to 144° C.

25 grams of the $\alpha$-acetoxy-$\alpha$-trifluoromethyl-propionitrile were pyrolyzed by passing the compound through a Pyrex tube filled with glass chips at a temperature of 500°–510° C. The acetoxy compound was added at the rate of 2 drops per second. During the pyrolysis, a slow stream of nitrogen was passed through the pyrolysis tube. Fractional distillation of the condensed product from the pyrolysis tube gave 10 grams of $\alpha$-trifluoromethyl acrylonitrile boiling at 73° C.

Example 3

*Poly-alpha-difluoromethyl acrylonitrile.*—10 grams of alpha-difluoromethyl acrylonitrile were cooled to —50° C. and 0.1 gram of triethyl phosphite was added. Polymerization started instantly. The mixture was then removed from the cooling bath and allowed to warm up to room temperature. The polymerization reaction was very exothermic and was completed within a few minutes. The polymer obtained was clear, hard, and moldable, and was soluble in acetonitrile. It would not support combustion. The above polymerization can also be carried out by adding only a trace of triethyl phosphite to the alpha-difluoromethyl acrylonitrile, at room temperature.

In place of the triethyl phosphite catalyst in the above example, there can be substituted an equivalent amount of pyridine, quinoline or triethylamine, to obtain similar resinous polymers.

Example 4

*Poly-alpha - trifluoromethyl acrylonitrile.*—10 grams of alpha-trifluoromethyl acrylonitrile were cooled to −50° C. and 0.1 gram of triethyl phosphite was added thereto. The mixture was then removed from the cooling bath and allowed to come to room temperature. Within a few minutes, the polymerization was completed. There was thus obtained a clear, hard, thermoplastic resinous polymer, which was moldable, soluble in acetonitrile and which would not support combustion by itself. The polymerization can also be carried out at room temperature, provided only a trace of the triethyl phosphite is used. In place of the triethyl phosphite catalyst in the above example, there can be substituted an equivalent amount of pyridine, quinoline or triethylamine, to obtain similar resinous polymers.

Example 5

*Copolymer of alpha-difluoromethyl acrylonitrile and styrene.*—50 grams of alpha-difluoromethyl acrylonitrile, 10 grams of styrene and 0.6 gram of benzoyl peroxide were polymerized at 50° C. in a stoppered bottle. When the polymerization was about 15–30 per cent complete, a small amount of phenyl-alpha-naphthylamine was added and the mixture then poured with stirring into a larger amount of methanol. The white solid which separated as a precipitate was filtered off, washed with methanol and dried. Fibers spun from an acetone solution of the polymer showed good physical properties after stretching. In place of the styrene in the above example, there can be substituted alpha-methylstyrene, dichlorostyrene or ortho-acetamino styrene to obtain corresponding resinous products.

Example 6

*Copolymer of alpha-difluoromethyl acrylonitrile and butadiene.*—4 grams of alpha-difluoromethyl acrylonitrile, 0.5 gram of urea peroxide, 0.9 gram of gelatin, 0.05 gram of 2-ethylhexanol, 0.06 gram of carbon tetrachloride and 0.18 gram of a sodium alkyl naphthalene sulfonate were emulsified and held at 55° C. for a period of 4 days with stirring. Then a small amount of phenyl-alpha-naphthylamine was added and the polymer precipitated by adding hydrochloric acid. The polymer thus obtained was tough, elastic and vulcanizable. In place of the butadiene in the above example, there can be substituted an equivalent amount of 2-methylbutadiene, 2,3-dimethybutadiene, 2-chlorobutadiene, 2-cyanobutadiene, 2-acetoxybutadiene, 2-acyloxybutadiene, 2-acetoaminobutadiene or 2-methyl-3-cyanobutadiene to give the corresponding resinous copolymers.

Example 7

*Copolymer of alpha-trifluoromethyl acrylonitrile and styrene.*—2 grams of alpha-trifluoromethyl acrylonitrile and 8 grams of styrene were copolymerized at 60° C., in an atmosphere of nitrogen, using 0.02 gram of acetyl peroxide as a catalyst. The resulting clear, hard polymer was readily molded into stable shapes. In place of styrene in the above example, there can be substituted an equivalent amount of 2,5-dichlorostyrene, para-cyanostyrene, p-N, N-dimethylsulfonamido styrene or p-trifluoromethyl styrene to give the corresponding resinous copolymers.

Example 8

*Copolymer of alpha-trifluoromethyl acrylonitrile and methyl methacrylate.*—(a) 5 grams of alpha-trifluoro acrylonitrile, 5 grams of methyl methacrylate and 0.02 gram of benzoyl peroxide were heated at 60° C., for a period of 24 hours. The resulting polymer was clear, hard and readily molded. The polymer was soluble in acetone and had a softening point above 100° C. For methyl methacrylate in the above example, there can be substituted an equivalent amount of cyclohexyl methacrylate or isopropyl methacrylate to give similar copolymeric resins.

(b) 2 grams of alpha-trifluoromethyl acrylonitrile, 10 grams of methyl methacrylate and 0.2 gram of benzoyl peroxide were added to 50 c. c. of water containing 0.25 per cent of gum arabic. The mixture was tumbled at 80° C. for 24 hours. The small, clear beads thus obtained were filtered off, washed and dried. The polymer had a softening point about 100° C. and was readily moldable to stable shapes.

Example 9

*Copolymer of alpha-trifluoromethyl acrylonitrile and acrylonitrile.*—A mixture of 5 grams of alpha-trifluoromethyl acrylonitrile, 10 grams of acrylonitrile, 2 grams of potassium oleate, 0.1 gram of ammonium persulfate and 0.2 gram of ammonium bisulfite was added to 100 c. c. of distilled water. After 20 hours at room temperature, acetic acid was added and the resulting precipitate of a white polymer was filtered off, washed and dried. The polymer was soluble in dimethyl acetamide. In place of the acrylonitrile in the above example, there can be substituted an equivalent amount of vinyl chloride, the resulting resinous polymer being soluble in acetone and readily moldable into stable shapes.

Example 10

*Copolymer of alpha-trifluoromethyl acrylonitrile and methacrylonitrile.*—A mixture of 5 grams of alpha-trifluoromethyl acrylonitrile, 5 grams of methacrylonitrile and 0.02 gram of lauroyl peroxide was heated at 60° C. for a period of 24 hours. A clear, hard and moldable polymer was obtained.

Example 11

*Copolymer of alpha-trifluoromethyl acrylonitrile, acrylonitrile and dimethyl fumarate.*—2 grams of alpha-trifluoromethyl acrylonitrile, 5 grams of acrylonitrile and 2 grams of dimethyl fumarate were mixed with 0.02 gram of benzoyl peroxide, and the mixture heated at 70° C. for a period of 24 hours. A clear, hard and moldable resinous polymer was obtained. For the dimethyl fumarate, there can be substituted an equivalent amount of diisopropyl fumarate, isopropenyl acetate, methyl acrylate or β-cyanoethyl acrylate to give similar resinous polymers.

Example 12

*Copolymer of alpha-trifluoromethyl acrylonitrile and acrylamide.*—A mixture of 2 grams of alpha-trifluoromethyl acrylonitrile, 5 grams of acrylamide and 0.02 gram of acetyl peroxide was dissolved in 30 c. c. of acetnitrile. The solution was heated at 60° C. for a period of 35 hours. The white precipitated polymer thus obtained was filtered off, washed and dried. The polymer was soluble in warm water. An equally good resinous polymer was obtained by substituting an equivalent amount of methacrylamide for the acrylamide in the above example.

*Example 13*

*Copolymer of alpha-trifluoromethyl acrylonitrile and butadiene.*—A mixture of 2 grams of alpha-trifluoromethyl acrylonitrile and 10 grams of butadiene was polymerized at 60° C., in the presence of 40 grams of a 1.5 per cent aqueous solution of potassium oleate as an emulsifying agent, 0.5 gram of hydrogen peroxide as a polymerization catalyst, 0.1 gram of diisopropyldixanthogen as a polymerization modifier and 0.02 gram of ferrous sulfate. The polymerization was completed in about 24 hours. The resinous product was a latex-like dispersion resembling natural rubber latex.

*Example 14*

*Copolymer of alpha-trifluoromethyl acrylonitrile and vinylidene chloride.*—4 grams of alpha-trifluoromethyl acrylonitrile, 10 grams of vinylidene chloride, 2 grams of potassium oleate, 0.1 gram of ammonium persulfate and 0.2 gram of ammonium bisulfite were added to 100 c. c. of distilled water. After 20 hours at 40° C., acetic acid was added to the mixture and the precipitated polymer thus obtained was filtered off, washed and dried. The white polymer was moldable. In place of the vinylidene chloride in the above example, there can be substituted an equivalent amount of vinylidene fluoride to obtain corresponding resinous polymers.

It will be understood that other equally valuable resinous copolymers of my new alpha-difluoromethyl and alpha-trifluoromethyl acrylonitriles can be prepared by copolymerizing the acrylonitriles with other unsaturated organic compounds, such as those mentioned, by employing the general procedures described in the specific examples.

What I claim is:
1. A compound having the general structural formula:

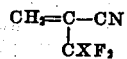

wherein X represents a member selected from the group consisting of an atom of hydrogen and an atom of fluorine.

2. Alpha-difluoromethyl acrylonitrile.
3. Alpha-trifluoromethyl acrylonitrile.
4. A polymer of a compound having the general structural formula:

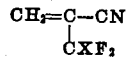

wherein X represents a member selected from the group consisting of an atom of hydrogen and an atom of fluorine.

5. A copolymer of from 5 to 95 molecular proportions of alpha-difluoromethyl acrylonitrile with from 95 to 5 molecular proportions of styrene.

6. A copolymer of from 5 to 95 molecular proportions of alpha-trifluoromethyl acrylonitrile with from 95 to 5 molecular proportions of styrene.

7. A copolymer of from 5 to 95 molecular proportions of alpha-trifluoromethyl acrylonitrile with from 95 to 5 molecular proportions of methyl methacrylate.

JOSEPH B. DICKEY.

REFERENCES CITED

The following references are of record in the file of this patent:

UNITED STATES PATENTS

| Number | Name | Date |
|---|---|---|
| 2,356,075 | Migrdichian | Aug. 15, 1944 |

FOREIGN PATENTS

| Number | Country | Date |
|---|---|---|
| 570,616 | Great Britain | July 16, 1945 |